3,136,746
PROCESS FOR PREPARING LINEAR HIGH POLYMERS OF N-VINYL CARBAZOLE HAVING A REGULAR STRUCTURE

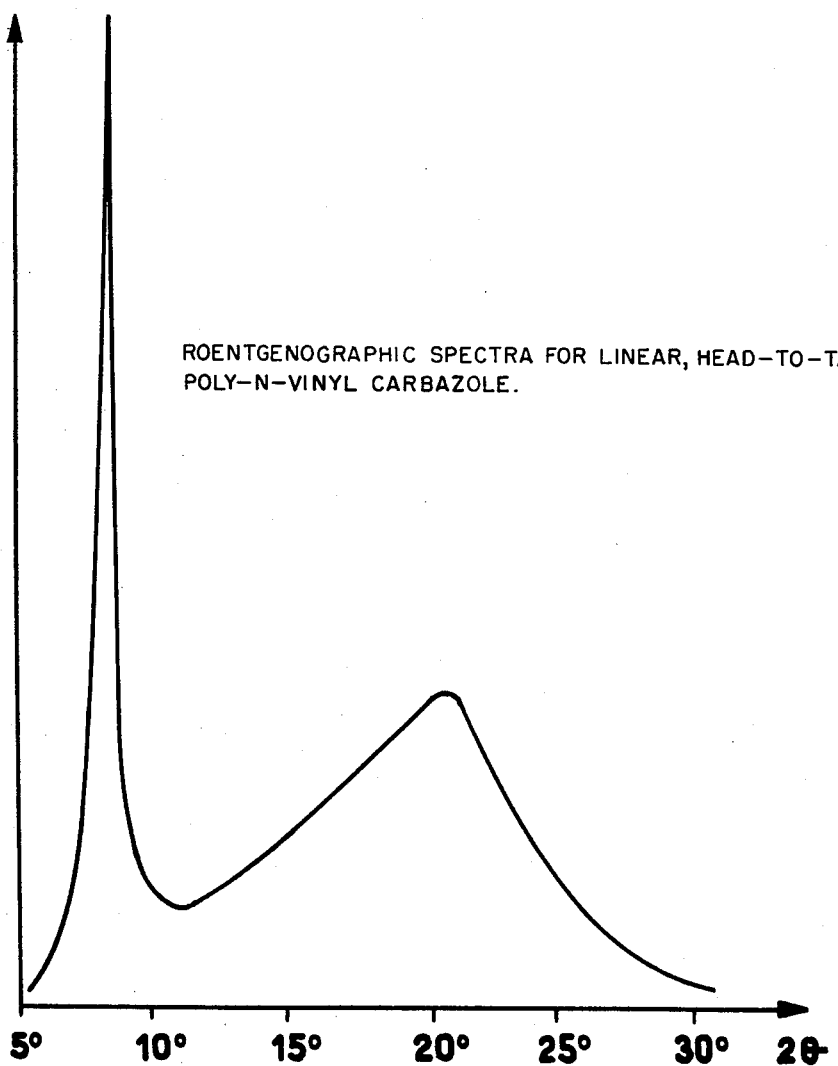

Giulio Natta, Giorgio Mazzanti, Gino Dall'Asta, and Antonio Casale, all of Milan, Italy, assignors to Montecatini Società Generale per l'Industria Mineraria e Chimica, a corporation of Italy
Filed July 31, 1961, Ser. No. 128,109
Claims priority, application Italy Aug. 2, 1960
9 Claims. (Cl. 260—88.3)

The present invention relates to a process for preparing linear high polymers of N-vinyl carbazole, which polymers have a regular structure and to be the improved polymers obtained from such process. It is known from the literature that N-vinyl carbazole can be polymerized to linear high polymers by using, either at room temperature or higher, catalytic systems of the free radical type. For this purpose catalysts such as, for example, organic peroxides, sodium peroxide, perborates, chromates, azo-nitriles and X-rays, have been used. The polymers thus obtained often reveal a low crystallinity upon X-ray examination. Their softening temperatures are generally about 200° C. Such polymers can therefore be processed in the molten state by extrusion or injection molding. However, if the temperature is increased above 250° C., such polymers tend to decompose and frequently are thus degraded to monomer form. The main uses of such polymers, owing to their extremely low dielectric constants and loss factors, are in dielectric applications.

It is also known that boron fluoride etherates (diethyl etherate, dibutyl etherate), which are catalysts of cationic type, can polymerize N-vinyl carbazole in solution in chlorinated hydrocarbons (for example methylene chloride, ethylene trichloride, etc.) at room temperature or even at lower temperatures, thereby producing high polymers having a partially regular structure and exhibiting softening temperatures of the same order as those of polymers obtained by means of free radical type catalysts.

An object of the present invention is to provide an improved process for preparing high molecular weight linear polymers of N-vinyl carbazole, which polymers exhibit a regular structure and a high crystallinity.

A further object of the present invention is the obtaining of linear polymers of N-vinyl carbazole and having regular structure, which polymers present a sterically ordered regular structure.

Additional objects will become apparent hereinafter.

Our invention will be more fully understood by reference to the accompanying drawing, wherein FIGURE 1 shows the diffraction spectrum of the polymers of our invention.

We have surprisingly found that by using a suitable catalytic system it is possible to obtain linear high polymers of N-vinyl carbazole having a much more ordered structure than the polymers described in the literature. This higher structure regularity is confirmed by X-ray examination and by the very high heat stability exhibited by such polymers.

The catalysts which can promote this stereospecific polymerization are compounds corresponding to the general fomula $$X_nMeR_m$$

in which Me is a polyvalent metal atom with a valence of 2 or higher and having an electronegativity lower than 1.8 in the Pauling scale and an ionic radius lower than 0.85 A. (for example, aluminium, tetravalent titanium, tetravalent tin, tetravalent and pentavalent vanadium, trivalent chromium, trivalent iron), X is a halogen, R is an organic radical selected from the group consisting of alkyl, aryl, alkoxy, and monocarboxylic acid radicals, and $n$ and $m$ are each a positive integer equal to 1 or higher, and the sum of $n+m$ corresponds to the valence of Me.

Our process is characterized in the N-vinyl carbazole is polymerized in the presence of catalysts of type $X_nMeR_m$ in which Me, X, R, $m$ and $n$ have the aforementioned meaning.

Particularly suitable catalysts for this purpose include monoethyl aluminum dichloride, diethyl aluminum monochloride, monoethyl aluminium dibromide, diethyl aluminium monobromide, and tin diacetate dichloride.

Other suitable catalysts comprised in the general formula $X_nMeR_m$ include titanium dichloride diacetate, titanium dichloride di-n-propoxide, and iron monochloride diacetate.

The stereospecific polymerization of N-vinyl carbazole can be carried out with the aforementioned catalysts at a temperature from about $+80°$ C. to $-120°$ C., preferably from about $0°$ C. to $-100°$ C. It is preferable (but not essential) to carry out our process in the presence of a diluent such as an aromatic or aliphatic hydrocarbon (e.g., toluene). The process is carried out preferably using low catalyst concentrations (with respect to the monomer), e.g., corresponding to a monomer/catalyst molar ratio of from about 50:1 to 100:1.

Although it was known heretofore that the aforementioned catalytic systems were capable of promoting the stereospecific polymerization of vinyl ethers and of alkoxystyrenes, it could not be foreseen that the same catalytic systems would also promote the stereospecific polymerization of N-vinyl carbazole.

The polymerization of vinyl ethers could logically be ascribed to the fact that the monomer contains an oxygen atom having an isolated electron pair bound to the vinyl group. This oxygen atom permits a particular association of the monomer with suitable catalysts during the polymerization. This association enables the monomer molecule to insert itself onto the growing polymeric chain always with the same presentation. Considering ortho-alkoxy-styrene, while the oxygen atom it not directly bound to the vinyl group its orienting effect on the polymerization is still sufficient to promote a stereospecific polymerization. Moreover, the oxygen atom which in vinyl ethers and alkoxy styrenes cause the coordination of the monomer with the catalyst, appears to be bound to relatively small, mobil groups which do not hinder this coordination.

In contrast with N-vinyl carbazole, there are no oxygen atoms capable of coordinating themselves in catalytic complexes. Instead, a nitrogen atom is present. Moreover, this nitrogen atom is not bound with two simple bonds to separate hydrocarbon groups but rather is incorporated in the very bulky heterocyclic molecule of carbazole which, due to its size, can present steric hindrances to its coordination in a catalytic complex. Furthermore, due to the aromatic structure of vinyl carbazole the isolated electron pair present in the nitrogen atom in shielded and therefore presents a very limited tendency to form coordination bonds.

Accordingly, it clearly could not have been foreseen that an orienting action of the same type as that encountered with vinyl ethers and alkoxy-styrenes would occur with N-vinyl carbazole, thereby resulting in a stereospecific polymerization of a monomer containing, not a relatively free oxygen but rather a nitrogen atom incorporated in the bulky vinyl carbazole ring.

The high molecular weight linear polymers of N-vinyl carbazole having stereoregular structure present a diffraction spectrum on powder (radiations $CuK\alpha$) registered with a Geiger counter, from which can be noted a main reflection at a $\theta$ angle of 8.15° and a wider peak at about $2\theta = 20.6°$. (See FIGURE 1.)

A filament extruded at a very high temperature (higher than about 400° C.) presents the spectrum of a partially oriented fiber.

The most interesting characteristics of the high polymers obtained by the aforementioned process, besides their ordered structure, is their very high heat stability. While in fact the corresponding commercial polymers of the prior art (Luvican M–170) present a softening temperature of about 200° C. to 250° C., are decomposed when kept for an extended time under a 12-mm. Hg pressure in a tube heated to temperatures above 260° C., and gradually lose the X-ray spectrum bands and are degraded (mostly to monomer and to other side products), the polymers of the present invention do not decompose when subjected to the same treatment but increase their order degree (which can be noted from the X-ray spectrum) as the temperature is raised up to 350° C. Their softening temperatures vary between 300° C. and 400° C., depending upon the polymerization conditions and on the particular catalyst used.

The polymers obtained according to the process of the present invention can be processed by the usual working methods and techniques used for thermoplastic polymers, although the temperatures required are higher. Shaped articles can be obtained from such N-vinyl carbazole polymers by compression molding, injection molding, extrusion, spinning, etc. Our polymers can be used also in admixture with other thermoplastic polymers.

The following examples will further illustrate our invention. All parts are by weight, unless otherwise stated.

Example 1

60 cc. of anhydrous pure toluene and 1.1 cc. (10 millimoles) of monoethyl aluminium dichloride are introduced into a three-necked glass flask provided with an agitator and a dropping funnel and kept under nitrogen. After cooling the mixture to −78° C. a solution of 20 g. (0.1 mole) of pure N-vinyl carbazole (melting point 66° C. to 67° C.) in 90 cc. of pure anhydrous toluene is added dropwise over a period of about two hours.

The reaction mixture is maintained at −78° C. for four hours. During the reaction described, the solution assumes a red color and gradually increases its viscosity until a considerable amount of insoluble product is finally precipitated. The catalyst is then destroyed by adding a small amount of methanol. The temperature is permitted to rise to room temperature and the reaction mixture is finally poured into 600 cc. of methanol, thus causing the precipitation of the polymer. After filtration and drying, 19.4 g. (corresponding to a conversion of 97%) of poly-N-vinyl carbazole are obtained.

The polymer is in the form of a white powder and is completely soluble in cold dioxane or acetophenone. In contrast, in such other solvents as benzene, toluene, decahydronaphthalene, and ortho-dichlorobenzene, a major proportion of the poly-N-vinyl carbazole is soluble while a minor portion is insoluble, even at the boiling point of the solvent.

In contrast, the poly-N-vinyl carbazole is insoluble, even at elevated temperatures, in aliphatic hydrocarbons, aliphatic ethers, alcohols, cyclohexane, acetone. Carbon tetrachloride and methyl ketone act as swelling agents but dissolve only a small fraction of the polymer.

The degree of crystallinity of crude poly-N-vinyl carbazole thus obtained can be increased by dry annealing under nitrogen or under vacuum at high temperatures (300° C. to 350° C.).

The polymer, when annealed (e.g., for half an hour under vacuum at 350° C.), presents a roentgenographic spectrum (radiations CuKα), registered with a Geiger counter on powder, from which a main reflexion at an angle $2\theta = 8.15°$ and a wider peak at about 20.6° are observed. Its softening point is approximately 350° C. The fraction extractable with boiling toluene, corresponding to 82% of the total, has an intrinsic viscosity, determined at 30° C. in toluene, of 0.53.

A stretched filament is obtained from the total polymer by heating to about 350° C. This filament, by X-ray examination, appears to be partially oriented. Moreover, very hard but relatively brittle sheets or laminae having clear surfaces are obtained by compression molding in a press at 340° C. to 360° C. under a pressure of about 100 atmospheres.

This example was repeated substituting monoethyl aluminium dibromide for the monoethyl aluminium dichloride. Equivalent results were obtained.

Example 2

Proceeding as described in Example 1, but adding 10 g. (0.05 mole) of N-vinyl carbazole dissolved in 90 cc. of pure anhydrous toluene to the solution of 0.11 cc. (1 millimole) of monoethyl aluminum dichloride in 60 cc. of pure anhydrous toluene, 9.6 g. (conversion of 96%) of poly-N-vinyl carbazole are obtained.

The properties of this polymer correspond to those described in Example 1, except for the fact that the portion soluble in boiling toluene is considerably reduced (21%), with a corresponding increase in the amount of insoluble portion (79%). The total polymer, molded in a press at 340° C. to 360° C., gives very hard laminae.

Example 3

By proceeding as described in Example 2 but using 0.28 cc. (2.5 millimoles) of catalyst and carrying out the monomer addition and the polymerization at 0° C. instead of −78° C., 9.8 g. (corresponding to a conversion of 98%) of poly-N-vinyl carbazole are obtained. The polymer has practically the same properties as the sample described in Example 2.

Example 4

By proceeding as described in Example 3 but carrying out the monomer addition and the polymerization at +80° C. and then continuing as already described, 9 g. (corresponding to a conversion of 90%) of poly-N-vinyl carbazole are obtained. The polymer has properties somewhat similar to those of the sample described in Example 2 (56% of soluble portion, 44% of insoluble portion) but an order degree slightly lower than that of the samples described in the preceding examples.

A stretched filament is prepared from the crude polymer by heating to about 350° C. X-ray examination shows the filament to be partially oriented. By molding the crude polymer in a press at about 330° C. under a pressure of about 100 atmospheres, sheets and laminae are obtained having characteristics similar to those of the sheets and laminae of Example 1.

Example 5

By proceeding as described in Example 1 but adding 10 g. of N-vinyl carbazole dissolved in 90 cc. of pure anhydrous toluene to a solution of 0.30 cc. (2.5 millimoles) of diethyl aluminium monochloride, 9.6 g. (conversion 96%) of poly-N-vinyl carbazole are obtained. The polymer thus obtained is completely soluble in boiling toluene. Its chemical, mechanical and thermal properties are similar to those of the sample described in Example 1. Its intrinsic viscosity, determined in toluene at 30° C., is 0.61.

A stretched filament is prepared from the crude polymer by heating to about 300° C. X-ray examination shows the fiber to be partially oriented. By molding the crude polymer in a press at a pressure of about 100 atmospheres and a temperature of about 350° C., sheets and laminae having characteristics similar to those of the sheets and laminae of Example 1 are obtained.

This example was repeated substituting diethyl aluminium monobromide for diethyl aluminium monochloride. Equivalent results were obtained.

Example 6

By proceeding as defined in Example 5 but carrying out the monomer addition and the polymerization at −40° C. and then proceeding as described, 9.3 g. (conversion of 93%) of poly-N-vinyl carbazole are obtained. Its properties are practically analogous to those of the sample of Example 5. Its intrinsic viscosity, determined in toluene at 30° C., is 0.91.

Example 7

By proceeding as described in Example 5 but using 0.77 g. (2.5 millimoles) of tin dichloride diacetate and then continuing as described in the preceding examples, 9.8 g. (conversion of 98%) of poly-N-vinyl carbazole are obtained. The polymer thus obtained is completely soluble in boiling toluene. Its properties are similar to those of the sample described in Example 1. Its intrinsic viscosity, determined in toluene at 30° C., is 0.35. This polymer, when molded in a press at a temperature from 350° C. to 370° C., gives very hard and relatively brittle laminae and sheets.

Example 8

By proceeding as described in Example 7 but using 0.15 g. (0.5 millimole) of tin dichloride diacetate and then continuing as already described, 2.3 g. (conversion of 23%) of poly-N-vinyl carbazole are obtained. The polymer has practically the same properties as those of the sample described in Example 7. Its intrinsic viscosity, determined in toluene at 30° C., is 0.26.

Example 9

By proceeding as described in Example 7 but carrying out the monomer addition and the polymerization at −40° C., 9.2 g. (conversion of 92%) of poly-N-vinyl carbazole are obtained. This polymer has practically the same properties as those of the sample described in Example 7. Its intrinsic viscosity, determined in toluene at 30° C., is 0.1.

Example 10

By proceeding as described in Example 5, but using 2.56 g. (10 millimoles) of titanium di-n-propoxide dichloride, 9.8 g. (conversion of 98%) of poly-N-vinyl carbazole are obtained. The polymer thus obtained is 75% soluble in boiling toluene. Its properties are similar to those of the product described in Example 1. The intrinsic viscosity of the fraction soluble in toluene is 0.45 (determined in toluene at 30° C.).

Example 11

By proceeding as described in Example 5, but using 0.6 g. (2.5 millimoles) of titanium dichloride diacetate, 3.3 g. (conversion of 33%) of poly-N-vinyl carbazole are obtained. The polymer thus obtained is completely soluble in boiling toluene. Its properties are similar to those of the product described in Example 1.

Variations can of course be made without departing from the spirit of our invention.

Having thus described our invention, what we desire to secure and claim by Letters Patent is:

1. A process for preparing linear, head-to-tail crystalline polymers of N-vinyl carbazole having a regular sterically ordered structure and a very high thermal stability, this process comprising homopolymerizing N-vinyl carbazole in the presence of a catalyst consisting essentially of a compound having the general formula $$X_n MeR_m$$

in which Me is selected from the group consisting of aluminum and tin, X is selected from the group consisting of Cl and Br, and R is an organic radical selected from the group consisting of linear alkyl, aryl, linear alkoxy, and monocarboxylic acid radicals, $n$ and $m$ are each integers of at least 1, and the sum of $n+m$ corresponds to the valency of Me.

2. The process of claim 1 wherein the catalyst is monoethyl aluminum dichloride.

3. The process of claim 1 wherein the catalyst is diethyl aluminum monochloride.

4. The process of claim 1 wherein the catalyst is monoethyl aluminum dibromide.

5. The process of claim 1 wherein the catalyst is diethyl aluminum monobromide.

6. The process of claim 1 wherein the catalyst is tin dichloride diacetate.

7. The process of claim 1 carried out at a temperature from about +80° C. and −120° C., preferably from 0° C. to −100° C.

8. The process of claim 1 carried out with a monomer/catalyst molar ratio from 20:1 to 200:1.

9. The process of claim 1 wherein the polymerization is carried out in the presence of a hydrocarbon diluent.

References Cited in the file of this patent

UNITED STATES PATENTS 3,024,225    Teot _____ Mar. 6, 1962